(12) United States Patent
Bartz et al.

(10) Patent No.: US 7,131,112 B1
(45) Date of Patent: Oct. 31, 2006

(54) MANAGING CODE CHANGES FOR SOFTWARE DEVELOPMENT

(75) Inventors: Bradley J. Bartz, Lynnwood, WA (US); Christopher G. Kaler, Redmond, WA (US); Martyn S. Lovell, Seattle, WA (US); Yevgeniy Rozenfeld, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 236 days.

(21) Appl. No.: 09/717,676

(22) Filed: Nov. 21, 2000

(51) Int. Cl.
*G06F 9/44* (2006.01)
*G06F 12/00* (2006.01)

(52) U.S. Cl. ...................... 717/122; 707/201
(58) Field of Classification Search ............... 717/101, 717/121–126, 170–178, 116, 100, 110; 707/201–203; 705/511; 709/215, 328
See application file for complete search history.

(56) References Cited

U.S. PATENT DOCUMENTS

| | | | | |
|---|---|---|---|---|
| 4,912,637 A * | 3/1990 | Sheedy et al. | ............... | 707/203 |
| 5,481,722 A * | 1/1996 | Skinner | ....................... | 717/122 |
| 5,600,834 A * | 2/1997 | Howard | ....................... | 707/201 |
| 5,649,200 A * | 7/1997 | Leblang et al. | ............. | 717/122 |
| 5,729,744 A * | 3/1998 | Gerken et al. | ............... | 707/203 |
| 5,806,078 A * | 9/1998 | Hug et al. | .................. | 715/511 |
| 5,897,642 A * | 4/1999 | Capossela et al. | .......... | 707/203 |
| 5,903,897 A * | 5/1999 | Carrier et al. | ............... | 707/203 |
| 6,195,795 B1* | 2/2001 | Block et al. | ................. | 717/101 |
| 6,223,343 B1* | 4/2001 | Hopwood et al. | ........... | 717/101 |
| 6,256,773 B1* | 7/2001 | Bowman-Amuah | ......... | 717/121 |
| 6,349,407 B1* | 2/2002 | Towfiq | ....................... | 717/170 |
| 6,367,077 B1* | 4/2002 | Brodersen et al. | .......... | 717/170 |
| 6,397,228 B1* | 5/2002 | Lamburt et al. | ............ | 707/203 |
| 6,546,545 B1* | 4/2003 | Honarvar et al. | ........... | 717/100 |

OTHER PUBLICATIONS

Panagiotis, Diff Man Page/Man-cgi 1.11, 1994.*
Hederman, L. et al., "Versioned Documents in a Technical Document Management System", *Esprit*, 1990, Proceedings of the Esprit Conference (Eur 13148), 607-618.
Heckle, P. "A Technique for Isolating Differences Between Files", *Communications of the ACM*, 1978, 21(4), 264-268.
Gagnon, G. "Version-Control Software—Tools for managing change in complex development environments", *PC Magazine*, Mar. 4, 1997, 16(5), 219-226.
Yu, L. et al., "A Linear-Time Scheme for Version Reconstruction", *ACM Transactions on Programming Languages and Systems*, 1994, 16(3), 775-797.

* cited by examiner

*Primary Examiner*—Wei Zhen
*Assistant Examiner*—Tuan A. Vu
(74) *Attorney, Agent, or Firm*—Woodcock Washburn LLP

(57) ABSTRACT

Development of multiple-version software employs versioned documents in a store. The documents are compared (differenced) at both line and character levels. Potential conflicts in merged documents are marked by detecting possible alternative histories from a common parent document. Changes from an earlier version are removed from a later version of the same document even when the document has intervening versions. A build lab allows developers to work in parallel on a new software build while another build is being run and patched on a different set of documents; the developers each have private copies from which changes pertaining to a build have been added, and then backed out when the file is returned to a common area.

18 Claims, 7 Drawing Sheets

MANAGING CODE CHANGES FOR SOFTWARE DEVELOPMENT

TECHNICAL FIELD

The present invention relates to electronic data processing, and more particularly concerns the integration of code changes made by different developers into consistent modules.

BACKGROUND

The development of application programs, operating systems, and other complex software involves the cooperative effort of large numbers of individuals and groups of individuals working on hundreds or even thousands of interdependent modules over long periods of time. In the 1970s, companies that created such programs began deliberate efforts to create organizational frameworks and systems of programs to manage long and complex development cycles. More recently, programs for managing software development projects have become available for licensing to smaller institutions.

The major part of systems for developing software concerns systems for controlling different versions of the source code for the software. A source-control system typically includes of several pieces, almost always including a storage engine that provides efficient versioned storage of files, a differencing/merging engine for combining different versions of the same file, modules for operating upon multiple file formats such as text documents and Unicode, and user interfaces for various parts of the system, including those for differencing and merging.

Change management is the overall process of keeping track of modifications in source-code and other versioned documents across time and across multiple development groups working in parallel with each other. As programs become larger and more complex, change management becomes increasingly necessary to minimize errors and conflicts across code modules from different versions and from different groups. Even development systems offered to smaller organizations need much more sophisticated change-management techniques. Relatively primitive conventional merging or differencing (these terms are synonymous in the art) methods are no longer adequate, for example. Developers often desire to deal with collections of changes as entities, rather than manipulating them individually. Also, conventional development systems do not deal adequately with temporary patches made when modules are assembled into a build for testing the complete program.

SUMMARY

The present invention offers greater capabilities in change management for software development systems, in a way that allows even smaller systems to benefit.

An aspect of the invention provides better ergonomics and increased speed in merging versioned documents by indicating differences between them at multiple different subdivisions or levels, such as line and character levels.

Another aspect of the invention increases the reliability of merges between documents by comparing them not only for incompatible changes with respect to each other, but also by detecting possible alternative histories from a common parent document, and flagging these as potential conflicts.

Another aspect increases flexibility in reverting to previous versions by removing changes made during an earlier version to be backed out from a current version while retaining changes made in a version later than the removed version but earlier than the current version.

A further aspect of the invention increases the ability to integrate all the material pertaining to a change, by keeping it together in one place. This aspect associates both versioned and nonversioned documents for the same version together, so that they can be manipulated as a single unit.

Yet a further aspect permits developers to work in together in constructing a new build of the software even while another build is being tested and patched. Multiple copies of the documents are made in different areas. While one set of copies is built and tested, private copies for each builder have previous changes removed, so that they can modify clean copies of the documents.

DRAWING

Figure 4A:
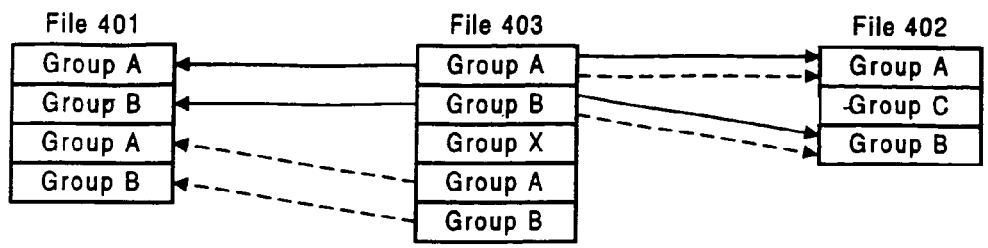
Figure 4B:
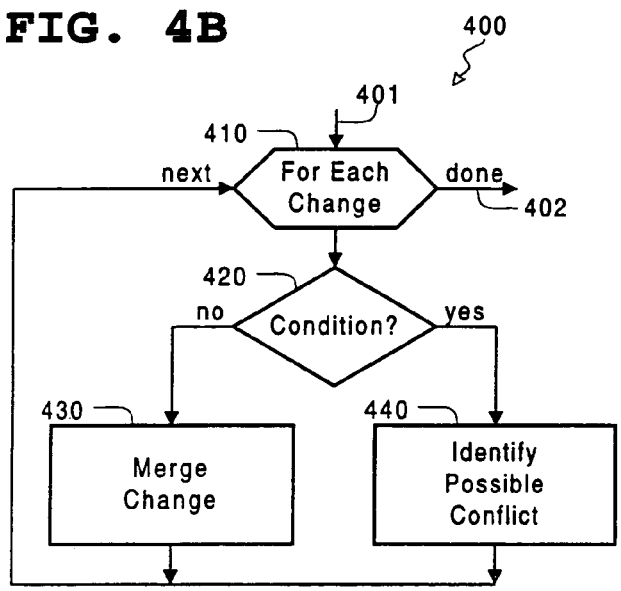

FIG. 4, comprising FIGS. 4A and 4B, shows a method for merging multiple documents according to the invention.

Figure 5:
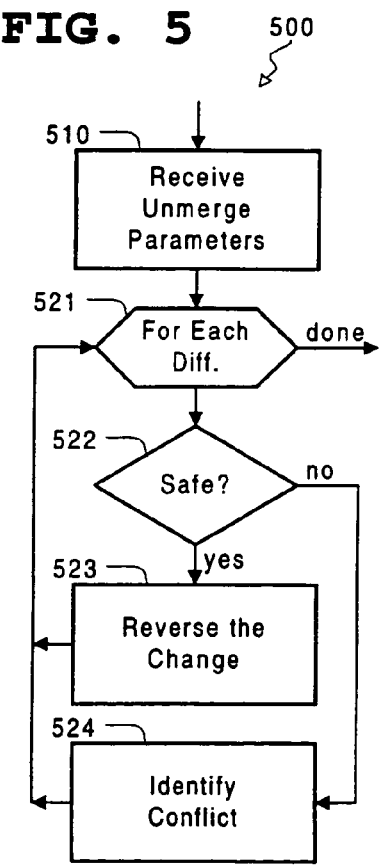

FIG. 5 depicts a method for recovering previous versions of development documents according to the invention.

Figure 6:
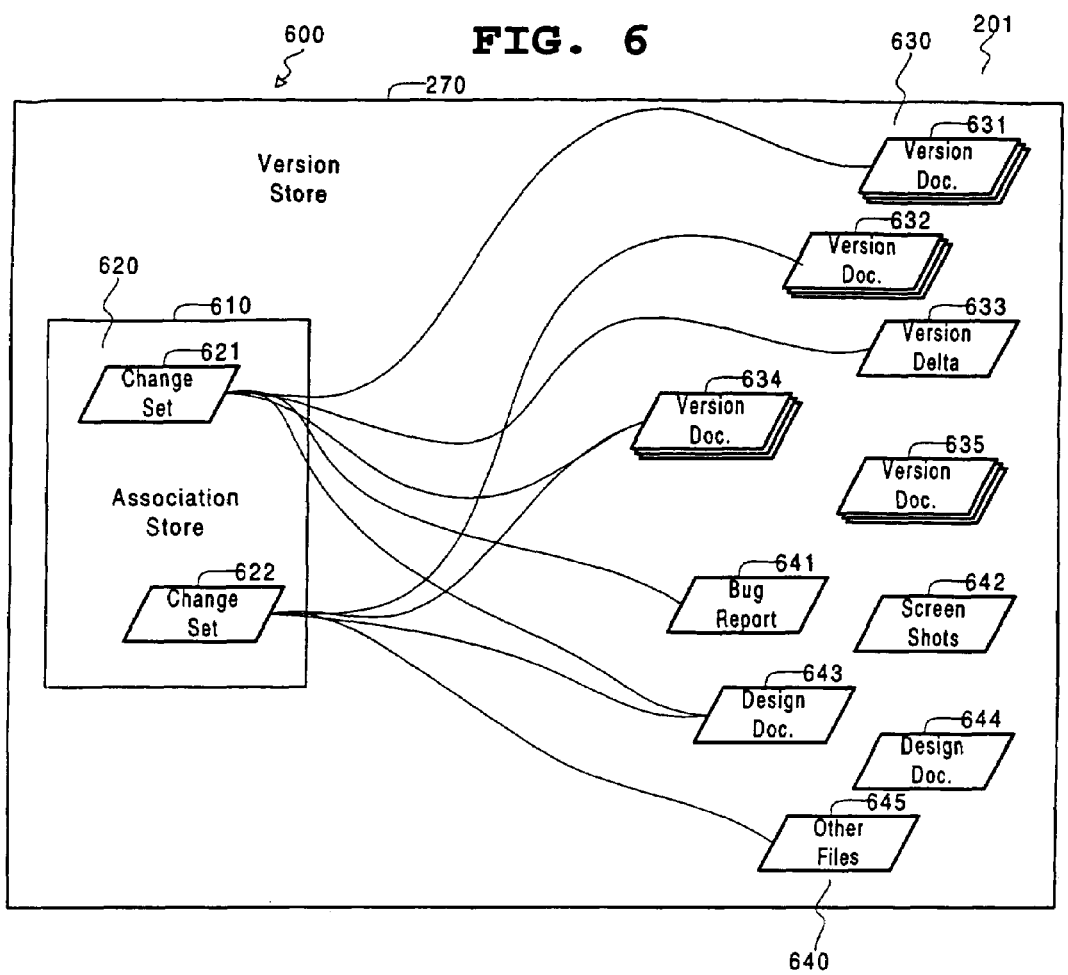

FIG. 6 is a symbolic diagram of a system for processing changes to multiple documents as a unit according to the invention.

Figure 7:
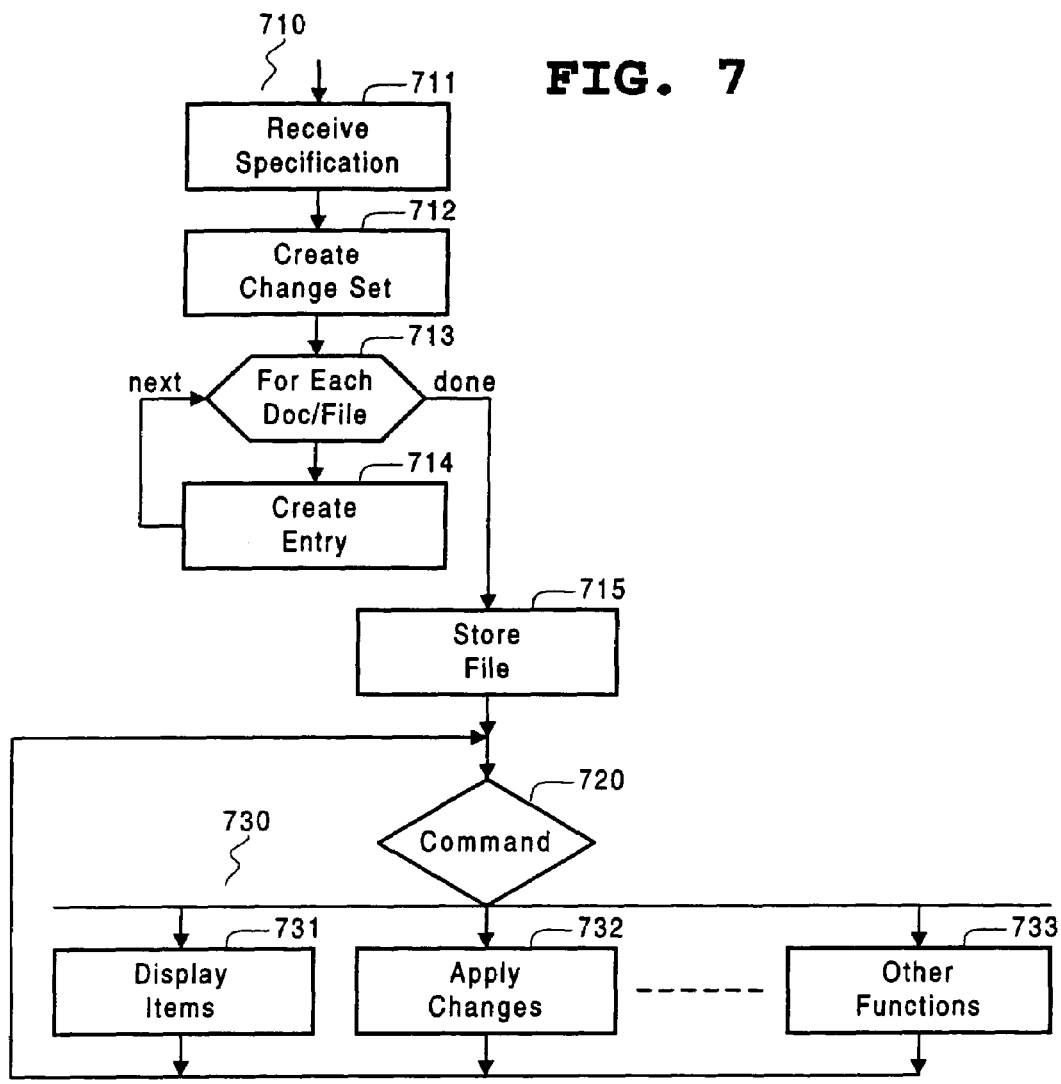

FIG. 7 is a flowchart of a method for handling changes to the multiple documents of FIG. 6

Figure 8:
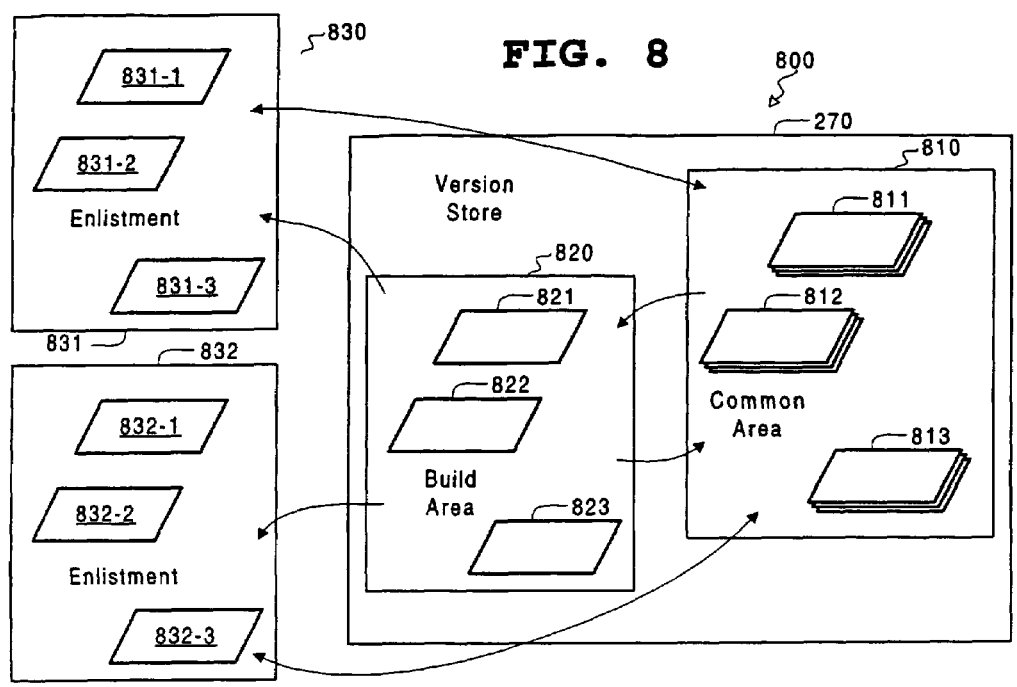

FIG. 8 is a block diagram of a system for manipulating changes made for a program build according to the invention.

Figure 9:
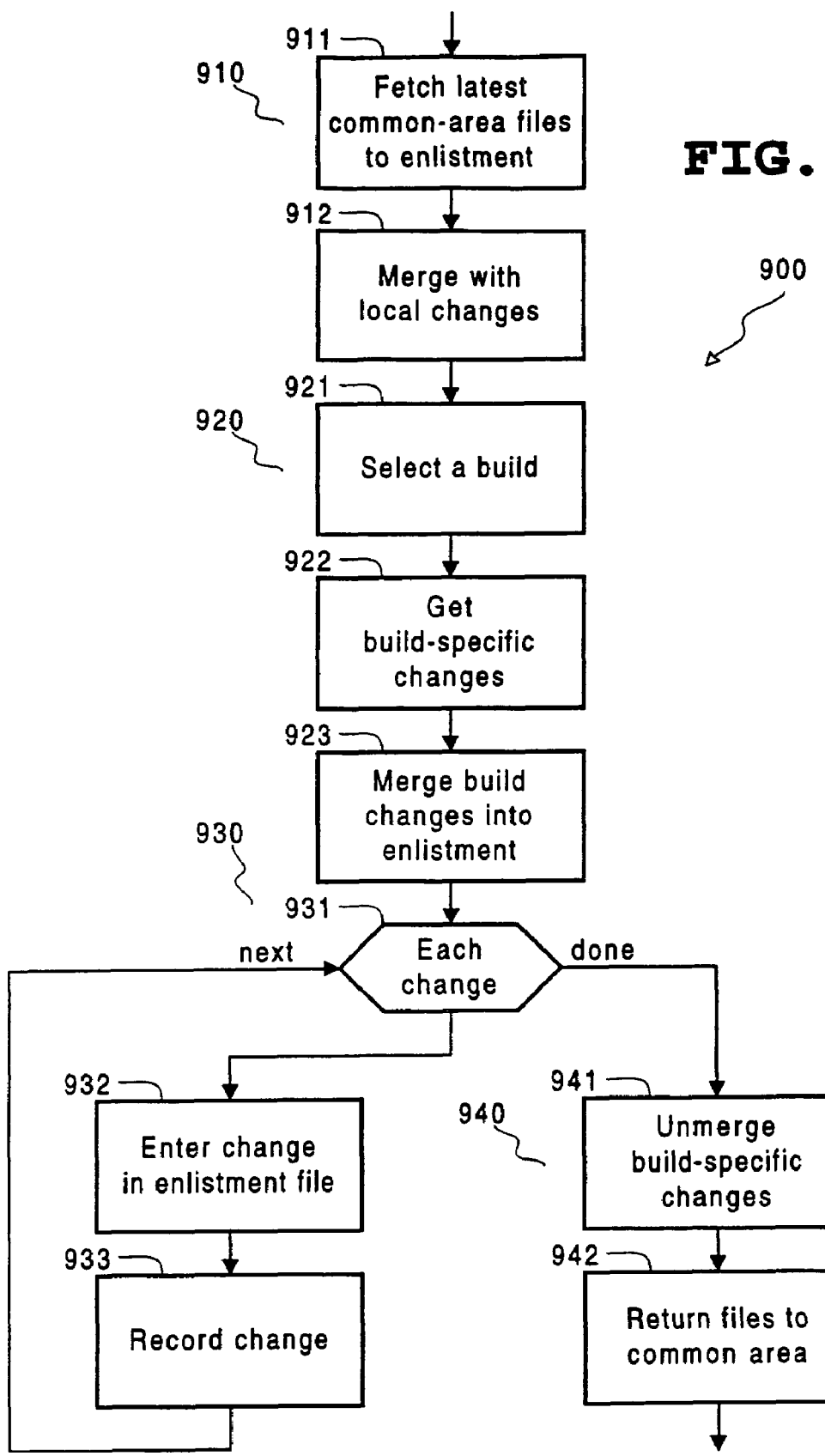

FIG. 9 is a flowchart of a method employing the system of FIG. 8.

DETAILED DESCRIPTION

This description and the accompanying drawing illustrate specific examples of embodiments in which the present invention can be practiced, in sufficient detail to allow those skilled in the art to understand and practice the invention. Other embodiments, including logical, electrical, and mechanical variations, are within the skill of the art. Skilled artisans will also recognize features and advantages of the invention other than those explicitly set forth. The scope of the invention is to be defined only by the appended claims, and not by the specific embodiments described below.

Environment

Figure 1:
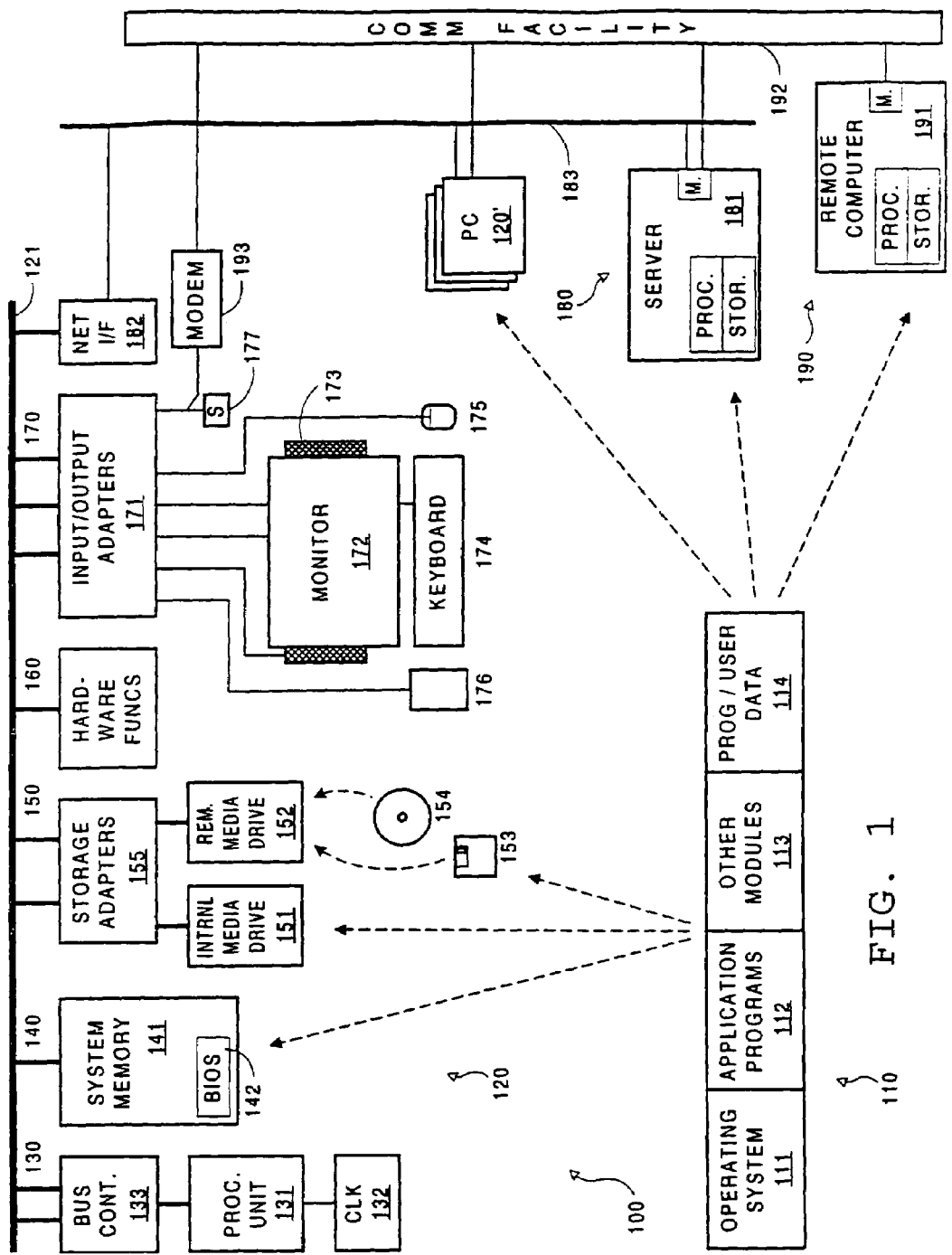
FIG. 1 is a block diagram of an illustrative environment for hosting the invention.

FIG. 1 is a high-level diagram of an illustrative environment 100 having software 110 and hardware 120 for hosting the invention as executable instructions, data, and/or electronic and mechanical components. Other suitable environments, and variations of the described environment are also possible.

Hardware components 120 are shown as a conventional personal computer (PC) including a number of components coupled together by one or more system buses 121 for carrying instructions, data, and control signals. These buses may assume a number of forms, such as the conventional ISA, PCI, and AGP buses. Some or all of the units coupled to a bus can act as a bus master for initiating transfers to other units. Processing unit 130 may have one or more microprocessors 131 driven by system clock 132 and coupled to one or more buses 121 by controllers 133. Internal memory system 140 supplies instructions and data to processing unit 130. High-speed RAM 141 stores any or all of the elements of software 110. ROM 142 commonly stores basic input/output system (BIOS) software for starting PC 120 and for controlling low-level operations among its components. Bulk storage subsystem 150 stores one or more elements of software 110. Hard disk drive 151 stores software 110 in a nonvolatile form. Drives 152 read and write software on removable media such as magnetic diskette 153 and optical disc 154. Other technologies for bulk storage are also known in the art. Adapters 155 couple the storage devices to system buses 121, and sometimes to each other directly. Other hardware units and adapters, indicated generally at 160, may perform specialized functions such as data encryption, signal processing, and the like, under the control of the processor or another unit on the buses.

Input/output (I/O) subsystem 170 has a number of specialized adapters 171 for connecting PC 120 to external devices for interfacing with a user. A monitor 172 creates a visual display of graphic data in any of several known forms. Speakers 173 output audio data that may arrive at an adapter 171 as digital wave samples, musical-instrument digital interface (MIDI) streams, or other formats. Keyboard 174 accepts keystrokes from the user. A mouse or other pointing device 175 indicates where a user action is to occur. Block 176 represents other input and/or output devices, such as a small camera or microphone for converting video and audio input signals into digital data. Other input and output devices, such as printers and scanners commonly connect to standardized ports 177. These ports include parallel, serial, SCSI, USB, FireWire, and other conventional forms.

Personal computers frequently connect to other computers in networks. For example, local area network (LAN) 180 connect PC 120 to other PCs 120' and/or to remote servers 181 through a network adapter 182 in PC 120, using a standard protocol such as Ethernet or token-ring. Although FIG. 1 shows a physical cable 183 for interconnecting the LAN, wireless, optical, and other technologies are also available: Other networks, such as wide-area network (WAN) 190 can also interconnect PCs 120 and 120', and even servers 181, to remote computers 191. Computers 181 and 191 have processors, storage, and communications equipment similar to those of PC 120, although usually of higher capacity. FIG. 1 illustrates a communications facility 192 such as a public switched telephone network for a WAN 190 such as an intranet or the internet. PC 120 can employ an internal or external modem 193 coupled to serial port 177. Other technologies such as packet-switching ISDN, ATM, DSL, frame-relay are also available. In a networked or distributed-computing environment, some of the software 110 may be stored on the other peer PCs 120', or on computers 181 and 191, each of which has its own storage devices and media.

Software elements 110 may be divided into a number of types whose designations overlap to some degree. For example, the previously mentioned BIOS sometimes includes high-level routines or programs which might also be classified as part of an operating system (OS) in other settings. The major purpose of OS 111 is to provide a software environment for executing application programs 112 and for managing the resources of system 100. An OS such as Microsoft® Windows® or Windows NT® commonly implements high-level application-program interfaces (APIs), file systems, communications protocols, input/output data conversions, and other functions.

Application programs 112 perform more direct functions for the user. A user normally calls them explicitly, although they can execute implicitly in connection with other applications or by association with particular data files or types. Modules 113 are packages of executable instructions and data which may perform functions for OSs 111 or for applications 112. Dynamic link libraries (.dll) and class definitions, for instance, supply functions to one or more programs. Data 114 includes user data of all types, data generated and/or stored by programs, and digital data that third parties make available on media or by download for use in computer 120. Software elements can be embodied as representations of program instructions and data in a number of physical media, such as memory 140, non-volatile storage 150, and signals on buses 183, 192, etc.

Figure 2:
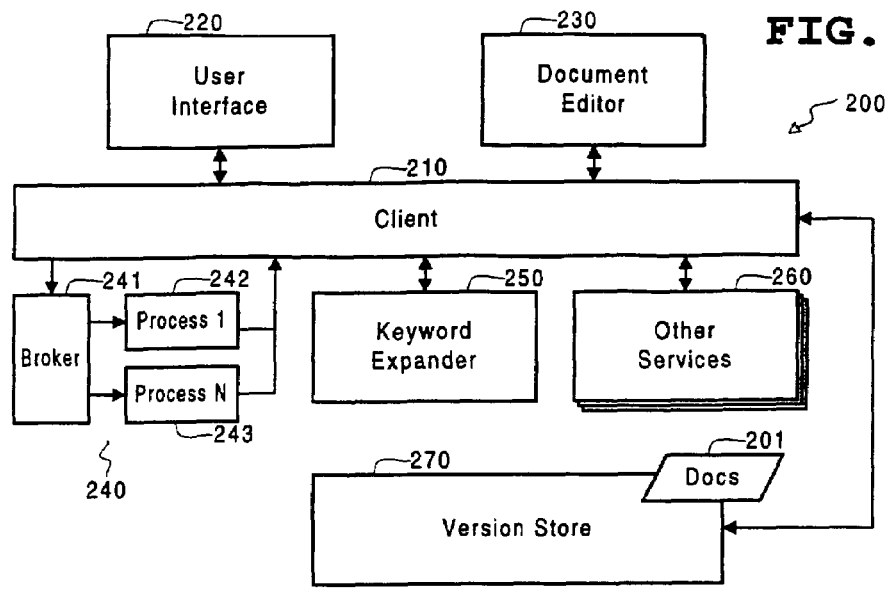
FIG. 2 is a high-level overall diagram of a development system in which the invention can be practiced.

FIG. 2 is a high-level overview of an illustrative software-development system 200, such as Visual Studio®, publicly available from Microsoft Corp. A client 210 manages the components of the system, passing data and commands among them. User interface 220, which may comprise input/output devices such as 170, FIG. 1, receives commands from a user and displays data to the user. Editor 230, which may take the form of an external general-purpose text processor, allows the user to display and modify development documents 101 containing source code, metadata, and other information.

The overall merge subsystem 240 handles the merging or differencing of two or more documents to determine conflicts among different versions, and for other purposes. The terms merging and differencing are often used synonymously. For the present purposes, these terms are also taken to include an "unmerging" function to be described later. In the present system, the overall merge subsystem includes a merge broker 241 that can find and select among multiple merge processes 242, 243, etc. The broker can select a process in response to a parameter in a merge command, or in other ways, such as the format of the documents to be merged. In this embodiment, broker 241 is a fixed part of the system; processes 242 and 243 include merge engines, merge preprocessors, and merge postprocessors, each of which can be a replaceable module in the system.

Some development systems also include a keyword expander 250 for inserting and processing tags in development documents. Tags represent metadata, that is, information about the document, rather than actual code or other content. Blocks 260 represent other functions and services provided by a software-development system. More than one service of a given type can be included. For example, different editors might handle documents having different formats.

A version store 270 holds documents 201 and other files and information pertaining to the system and to development projects. (The terms "document" and "file" are considered synonymous herein.) Normally, even a relatively small project has dozens, hundreds, or even thousands of documents associated with it. A version store typically comprises a file system dedicated to the development system, although it may employ the underlying structure of an operating system 111 and physical storage subsystem 150 of its host computer 120, FIG. 1. In larger system, physical storage may be physically located in a server such as 180 or 190.

The components of most development systems are tied together with specialized interfaces that differ for each component. Copending U.S. patent application Ser. No. 09/717,537, filed Nov. 21, 2000 discloses an improved development-system architecture in which the present invention can also be carried out, and is hereby incorporated by reference.

Multilevel Merging

Figure 3:
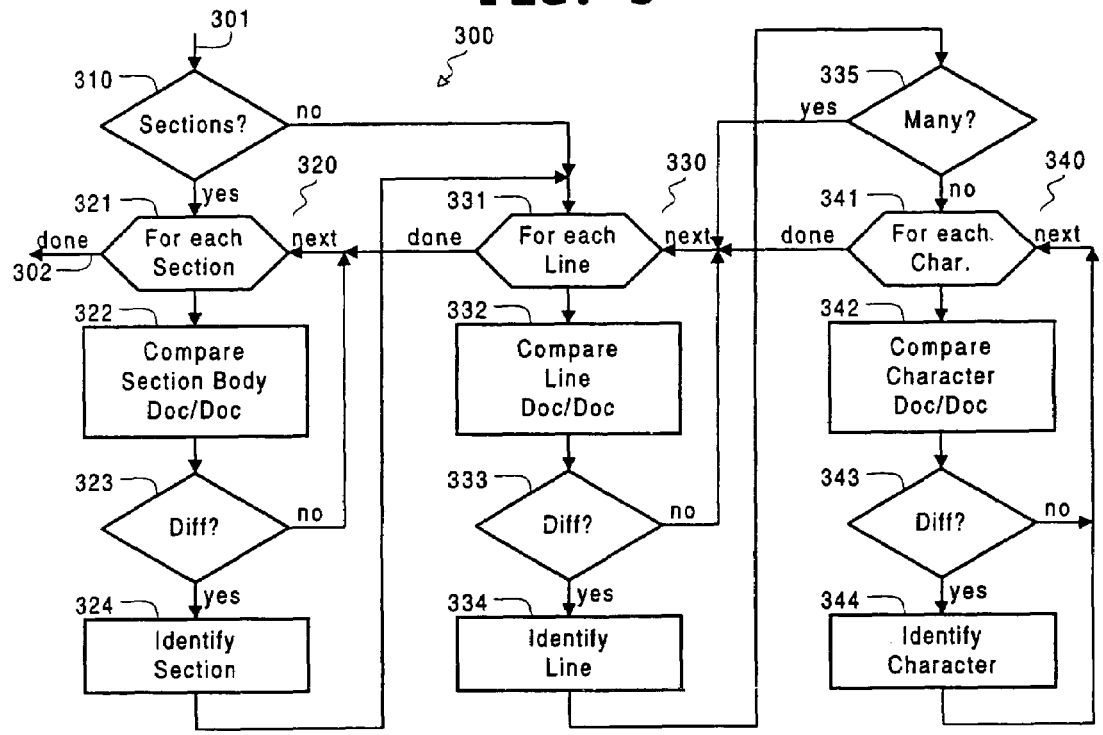
FIG. 3 is a flowchart of a method for merging documents at multiple levels according to the invention.

FIG. 3 is a flowchart of a method 300 for merging documents according to the invention. The method can be executed within merge subsystem 240, FIG. 2.

Differencing two documents—that is, displaying the differences between them—is conventionally performed in one or the other of two ways. Line-level differencing detects the fact that the corresponding lines of the documents to be merged have at least one difference from each other. This technique is fast, because the units of comparison are larger. It also has ergonomic advantages. A line of text frequently corresponds to a line of code, a complete command, or other lexical unit. Therefore, displaying changed lines exposes the semantics of the changes, the context in which a change has occurred. Character-level differencing pinpoints the actual characters that differ between the documents, and reduces eyeball search time to find the exact places at which changes have occurred.

Method 300 achieves the advantages of both line- and character-level differencing, and adds other levels as well. According to the invention, documents can include characters, symbols, or other indicia that divide them into sections. Although the significance of the sections is arbitrary, they can usefully correspond to functions, blocks, or other semantic units of a program or module. Method 300 illustrates one embodiment; the invention can employ more or fewer levels of differencing, and the levels can have any desired significance, other than or in addition to characters, lines, and sections.

If block 310 determines that the documents are divided into sections, then blocks 320 compare them section by section. Block 321 iterates through the sections. Block 322 compares the current section of one document with the same section of the other document. If block 323 detects any difference between the documents at this level, then block 324 identifies the section. This can be by generating an enumeration of differences/merges in the document, in the form of a rowset containing the information, producing an automatic merge having text markers indicating the conflicts, or some other operation. If the documents have no section, then block 310 transfers control to blocks 330.

Blocks 330 compare the lines of the documents within the current section if it has any differences at the section level. Block 331 iterates through each line in the section (or in the whole document if there are no sections). Block 332 compares the current line of one document with a corresponding line of the other document. If block 333 detects any difference between the documents within the current line, then block 334 identifies that line. If there are many differences between these lines, then identifying the individual characters is frequently not helpful to the user. In this event, block 335 omits the character-level comparison, returning directly to block 331. When all lines have been compared, control returns to block 321.

Blocks 340 compare the characters of the current line if it has some (but not too many) differences at the line level. Block 341 iterates through each character in the current line. Block 342 compares the current character of one document with the corresponding character of the other document. If block 343 detects any difference between the documents within the current line, then block 344 identifies that line. When all lines have been compared, control returns to block 331. When all iterations have completed, line 302 returns a merged document or rowsets, with the differences between the input documents identified.

Method 300 illustrates one embodiment having three levels of merging documents. More or fewer levels can participate in this multi-level procedure in other embodiments. The levels can correspond to divisions of a document other than characters, lines, and sections, if desired. Besides allowing multiple levels of differences to be indicated within the same process, method 300 has the advantage of speed. When a line of the input documents has no differences, character-level searching can be skipped altogether for that line. If sections are employed, then no line or character searching need be performed for a section that has no differences. Even though a computer must at some level compare individual characters to perform higher-level searches, such comparisons can almost always be executed with low-level string or block comparison instructions that are much faster. A third advantage is that some algorithms can only be usefully applied to small amounts of data. For example, in one embodiment, a line differencing algorithm only provides useful results if the lines are shorter than about 1000 characters. Getting smaller pieces like this is only possible using the multilevel block structure described above

Reliable Merging

FIG. 4 illustrates a more reliable merge of two input documents. A merge operation compares two files and detects any differences. For each difference, a determination is made as to whether or not it is safe to automatically merge the changes. For example, independent changes to unrelated lines are safe to merge. A conflict occurs for different changes to a common area—e.g., where two people have changed the same line in different ways. Users then review the conflicts and can have the safe merges automatically applied. A merge operation creates a composite of the two files In some cases, however, changes that appear compatible might in fact conflict with each other, because alternative interpretations of the file exist. In these case, one interpretation would say that the changes are compatible, and it it safe to merge the files. But another possible interpretation would determine that the changes had occurred in a way that raises a conflict among them. Prior merge systems do not detect these cases, and therefore can automerge changes that in fact conflict with each other and should be resolved manually.

FIG. 4A symbolizes an example of such a situation. Files 401 and 402 were modified independently by two different developers from a common root 403. Files 401 and 402 differ from each other. The blocks in FIG. 4A represent groups of characters, lines, or other units in the files that have been identified as being the same or different in the other files. The block marked "X" represents a group in root file 403 that was deleted from both of the modified files 401 and 402. The differences, however, could have resulted from different editing actions. The solid arrows represent one possible interpretation of the changes; the dashed arrows represent a different possible interpretation of the line groups from the root file. One of the interpretations is safe to automerge files 401 and 402, but the other interpretation produces a conflict that is should not be merged automatically. Existing systems merely select one of these alternatives. But, without a semantic understanding of the content, the selected alternative might be incorrect, and produce an automerge that incorporates changes that in fact conflict with other changes. The inventors have found a situation where an additional detection operation allows the present system to inhibit automerging and alert the user to a possible conflict among multiple changes.

FIG. 4B shows a method 400 for merging input documents according to the invention, so as to recognize the possibility of alternative interpretations. Line 411 receives the input documents. Block 410 iterates through the changes in the documents. For each change, block 420 detects the possible existence of alternative histories. If the condition does not exist, block 430 merges the changes into the output document. No conflicts arise in this situation. If, on the other hand, the condition is satisfied, then it is possible that a change that appears benign might in fact actually be a conflict. In that event, block 440 identifies a conflict in the output document. The user, alerted to this possibility, can then resolve whether or not a conflict does in fact exist; alternatively, a program might resolve the issue and select the correct history. When all changes have been processed, method 400 returns the merged output document at line 412. Although method 400 increases the amount of human interaction, it decreases errors in the merged document, and thus fosters confidence in the automatic merges that the method does perform.

Reversing Changes

FIG. 5 illustrates a method for "unmerging" according to the invention. There are occasions when a user might wish to reverse an operation in a document that has already been committed to the version store 270, FIG. 2. A change, or a set of changes, has been checked into a document in the version store, and a user desires to back it out from the stored version. For example, a user might wish to reverse a change made between version 2 and version 3 from a now current version 4 of a program. Also, a change that should be backed out might have already been propagated or promoted to another version. Promotion of a change means to apply a change made in one version to the corresponding document of a subsequent version. An unmerge operation determines which changes in a document came from a designated source document, and determines which of those changes can be removed safely, and which would cause conflicts if they were removed.

Method 500 performs an unmerge operation. As a working example, suppose that a file foo.cpp initially is at version 4. User Dick checks in a change in which he changes an initialization and adds a few lines of code. This becomes version 5. Jane then changes the initialization again, and checks in foo.cpp version 6. Later, Alex decides that version 7 should not include Bob's changes, but should preserve Jane's modifications. In this example, Alex wants to "uncheck in" Dick's change. The invention performs this operation by unmerging version 5 from version 6, using version 4 as a common ancestor.

Block 510 receives a designation of a file name, a version number of a desired common ancestor, and a version number containing the changes to be removed. Blocks 520 then performs the reverse of a merge operation. Block 521 detects each difference between the received file and the desired source file. Block 522 determines whether the difference can be removed safely, without introducing an undesired effects. As noted above, changes that are independent of other changes in related lines are safe. Block 523 automatically reverses safe changes. Block 524 identifies conflicts; these are changes that cannot be safely reversed because of conflicting intervening changes to the common ancestor. Users can then review the conflicts and make the appropriate changes. This example embodiment unmerges a text file. However, the concept of the invention clearly extends to unmerging arbitrary other file types, and indeed to unmerging namespace changes, just as they have been merged.

Change Sets

FIG. 6 shows a system 600 for treating changes to multiple arbitrary documents as a single unit according to the invention. An important aspect of change management in software-development systems involves the concept of a change set. Users often wish to treat updates to multiple source files, and updates to the namespace that contains those files, as a single unit for purposes of tracing changes and applying them. In the past, versioned source-code documents could be linked together in a single change set to be processed as a unit, but other documents and links were outside the system and had to be handled separately.

In system 600, version store 270, FIG. 2, includes an area called an association store 610 for holding any number of change-set entities, such as files 620. These file contain names by which they are known to system 200, FIG. 2, and entries to documents 201 that include both versioned code documents 630 and other documents or files 640. For example, a change set 621 named 'Issue4335' might relate to a fix for one particular problem or disagreement that had arisen in the project. Change set 621 has entries indicating that changes relating to this issue were made to items 631, 633, and 634. The light lines indicate links stored in the entries. Change-set links can be made to arbitrary items, such as versioned documents, files outside the version store, even to web pages. They can also be links to source changes, such as a delta between two versions, shown at 633. The latter are not documents as such, and they are tracked by the system. Change-set entries can also include system namespace changes, such as adds, renames, deletes, and shares.

Further entries indicate that the change set also includes a document 641 containing a bug report, and a file 643 of design documentation. All of the entries in a change set are treated as a unit. Change set 622 has entries designating that version documents 632 and 634 are to be treated as a unit, along with non-versioned documents 643 and 645. Change sets can include any type of document or file, in addition to or instead of the versioned documents 630. Image files 642 of screen shots, for instance, are included in change sets in exactly the same way as other stored units 640, and in exactly the same way as the version documents 630. The change set refers to a delta between versions, and is not itself a version. The change set can contain references to any arbitrary items or even to specific versions of items; the delta reference is for code changes checked in to the source-code control system. One particular technology for realizing an association store is found in commonly assigned patent application Ser. No. 09/717,587, incorporated herein by reference.

FIG. 7 shows a method 700 for processing the change sets of FIG. 6. To create a change set, blocks 710, block 711 receives a specification containing a name to be given to the set, and a list of items naming the documents and/or files to be included in the set. For source changes, this is a set of deltas between two versions of the project. Block 712 creates a change-set file having the specified name. For each item in the specification, block 713 causes block 714 to add an entry containing a reference to the designated file or document. Block 715 stores it in association store area 610, FIG. 6, although it could be stored anywhere.

Later commands 720 from a user cause method 600 to perform various actions 730 upon a change set named in the command. For example, if block 720 receives a user command to display a certain change set, block 731 displays a list of the items in that set. Block 732 responds to another command to apply the changes in the specified set. Block 733 represents other commands for manipulating the changes in the set. For example, a user could view the source changes for an item in the set, displaying the file highlighting the changes contained within the set.

Change sets having files of arbitrary type find additional uses in development environments that permit branching at the level of entire development projects, such as that described in commonly assigned patent application Ser. No. 09/717,723. For example, if a bug is resolved by a fix, applying it to a different branch could cause annotations to be made for that bug in that branch.

Concurrent Building and Development

FIGS. 8 and 9 describe additional processing of changes according to the invention. Software teams often make reference or master builds of their entire projects at frequent intervals—sometimes daily, or even more often—during the development cycle. A reference build may provide a basis for a day's work by the entire team. Individual developers can run tests of their day's changes by overlaying them onto the current reference build. If the reference build was certified to pass all tests as of the time it was released, then subsequent failures imply that the new changes cause the problems.

Reference builds have been complex to manage. Source documents are synchronized at a designated time such as midnight, and are combined in a build lab. The completed builds, however, frequently fail one or more of the tests. Temporary fixes must then be applied to some source-code documents until the modified build passes all the tests. But by that time the developers might already have made modifications to the documents that were modified in the build lab. Moreover, it is often difficult for developers to incorporate the build-lab fixes without inadvertently picking up other checked-in changes as well.

FIG. 8 illustrates a system 800 for managing program-build changes and similar temporary modifications made during intervals of a program project. A common area 810 of version store 270, FIG. 2, holds the versioned documents 811–813 representing the source-code files of the project. Another area, reference-build area 820, holds logical or physical copies 821–823 of the versions of documents 811–813 that have been frozen for the current build. In addition, individual developers have their own private copies 830 of the documents in build area 820, or copied or revised from common area 810. Each private copy is termed an enlistment 831 or 832. Enlistments are further described in application Ser. No. 09/717,537. An enlistment generally is against common area 810. This means that the common area is a reference base for anyone who gets files, checks them out, and checks them in. However, the common area is not guaranteed to work. Thus, developers wish to fetch files from a known-good build area 820 into their enlistment. For example, file 821—which is the build lab's version of the common-area file 811—is placed into the enlistment as file 831-1, File 821 might incorporate changes from file 811. As well, enlistment file 831-1 might include local changes that a developer has made. System 800 applies the changes in file 821 to the enlistment copy 831-1 so that the developer's local changes are preserved. Thus, an individual developer has an environment in an enlistment such as 831 that represents a "good build" plus that developer's local changes. When the developer knows that this works and has completed all changes, he or she wants to move the changes to common area 810. Merely checking in the enlistment file would also include the changes that were specific to the particular build of the files stored in area 820. To avoid this, system 800 remembers that the changes in file 821 were applied to enlistment file 831-1, and removes the changes that differentiate file 821 from file 811. Therefore, only the changes that were made by the developer to the enlistment file 831-1 are applied to the common-area file 811 when the enlisted file is checked back in to the common area 810. Similarly, a developer can fetch a new version of file 811 to enlistment 831. In that case, changes in file 821 are removed from copy 831-1, and any new changes to copy 811 are applied. (If the developer gets the latest versions of files from 810 prior to checking in, then any errors can be detected in the developer's private area 831 rather than in common area 810.) Although the copies 831/1-3 and 832/1-3 in each enlistment come from build area 820, they return to common area 810, as symbolized by arrows in FIG. 8.

FIG. 9 shows a process 900 for managing build changes for a single build according to the invention. The process is repeated for each build, and concurrently by a number of developers.

Blocks 910 synchronize a developer's files. Block 911 fetches the latest files for that developer from common area 810, FIG. 8 to the appropriate enlistment 830. Block 912 merges these files with local changes that the developer had made previously to the enlisted files. Blocks 920 convert the enlisted copies of the common-area files into build-specific files. Block 921 represents the developer's selection of a desired build to employ as a base for changes. Usually, this will be the current build. Block 922 adds the changes from the desired build. This can be done by comparing common-area files with the corresponding build-area files, or alternatively from a list of changes or some other source. Block 923 merges the changes from block 922 into the enlistment copies of the files. The developer now has in his or her own enlistment area a current version of the files to be updated.

Blocks 930 represent the developer's new local changes. For each change, block 931 iterates through blocks 932 and 933. The first of these enters the change the developer makes into the enlistment copy of one of the files. Block 933 records that change, which becomes one of the local changes that are merged in block 912 during the next session. When all changes have been completed, in one or more sessions, the developer checks the files back in, by means of blocks 940. Block 941 unmerges the build-specific changes. That is, it removes from the enlistment files the changes that were added in block 923. Block 942 then returns the files to common area 810, FIG. 8.

CONCLUSION

The present invention offers change management for facilitating the development of large and complex software such as operating systems and major applications by manipulating versioned documents. Documents can be compared and marked at different levels. Potential conflicts from possible alternative histories from a common parent document are marked for resolution. Changes from a earlier version are removed from a later version in the presence of changes from an intervening version. Changes are grouped into sets including not only the versioned documents but ancillary nonversioned documents as well. A build lab permits parallel development while a build is being run and patched, by employing private enlistment stores from which changes are removed and applied separately.

What is claimed is:

1. A computer-based method for reducing clutter within a comparison of documents comprising:
   receiving through a graphical user interface an input corresponding to a maximum number of displayable differences per level of the documents;
   comparing a first level section of the documents;
   determining that there is at least one difference between the documents within the first level section;
   identifying a set of second level sections that are subsections of the first level section;
   comparing each of the second level sections to determine whether there is at least one difference between the documents within the second level section;
   calculating a quantity of non-matching second level sections in which there is at least one difference between the documents;
   determining whether the quantity of non-matching second level sections is more than the maximum number of displayable differences;
      if not, then displaying identifications of the non-matching second level sections; and
      if so, then returning to the first level section and displaying an identification of the first level section as a non-matching section without displaying identifications of the non-matching second level sections,
   wherein either:
      the first level section is a paragraph and the second level sections are lines; or
      the first level section is a line and the second level sections are characters.

2. The method of claim 1, comprising receiving through the graphical user interface the input corresponding to a maximum number of displayable different characters per line.

3. The method of claim 1, comprising receiving through the graphical user interface the input corresponding to a maximum number of displayable different lines per paragraph.

4. The method of claim 1, comprising receiving through the graphical user interface a plurality of inputs, each of which is specific to a particular level of the documents.

5. The method of claim 4, wherein receiving through the graphical user interface the plurality of inputs comprises:
   receiving through the graphical user interface a first input corresponding to a maximum number of displayable different lines per paragraph; and
   receiving through the graphical user interface a second input corresponding to a maximum number of displayable different characters per line.

6. The method of claim 1, comprising receiving through the graphical user interface an input that is adjustable by a user.

7. A computer-readable medium having computer-executable instructions for performing steps comprising:
   receiving through a graphical user interface an input corresponding to a maximum number of displayable differences per level of the documents;
   comparing a first level section of the documents;
   determining that there is at least one difference between the documents within the first level section;
   identifying a set of second level sections that are subsections of the first level section;
   comparing each of the second level sections to determine whether there is at least one difference between the documents within the second level section;
   calculating a quantity of non-matching second level sections in which there is at least one difference between the documents;
   determining whether the quantity of non-matching second level sections is more than the maximum number of displayable differences;
      if not, then displaying identifications of the non-matching second level sections; and
      if so, then returning to the first level section and displaying an identification of the first level section as a non-matching section without displaying identifications of the non-matching second level sections,
   wherein either:
      the first level section is a paragraph and the second level sections are lines; or
      the first level section is a line and the second level sections are characters.

8. The computer-readable medium of claim 7, wherein the input corresponds to a maximum number of displayable different characters per line.

9. The computer-readable medium of claim 7, wherein the input corresponds to a maximum number of displayable different lines per paragraph.

10. The computer-readable medium of claim 7, wherein the input comprises a plurality of inputs, each of which is specific to a particular level of the documents.

11. The computer-readable medium of claim 10, wherein the plurality of inputs comprises:
   a first input corresponding to a maximum number of displayable different lines per paragraph; and
   a second input corresponding to a maximum number of displayable different characters per line.

12. The computer-readable medium of claim 7, wherein the input is adjustable by a user.

13. A system for reducing clutter within a comparison of documents comprising:
   the documents each comprising a first level section and a set of second level sections that are subsections of the first level section, wherein either:
      the first level section is a paragraph and the second level sections are lines; or
      the first level section is a line and the second level sections are characters: and
   a computer comprising:
   a graphical user interface that receives an input corresponding to a maximum number of displayable differences per level of the documents; and
   a merge subsystem that performs the following steps:
      calculating a quantity of non-matching second level sections in which there is at least one difference between the documents
      determining whether the quantity of non-matching second level sections is more than the maximum number of displayable differences;
         if not, then displaying identifications of the non-matching second level sections; and
         if so, then returning to the first level section and displaying an identification of the first level section as a non-matching section without displaying identifications of the non-matching second level sections.

14. The system of claim 13, wherein the input corresponds to a maximum number of displayable different characters per line.

15. The system of claim 13, wherein the input corresponds to a maximum number of displayable different lines per paragraph.

16. The system of claim 13, wherein the input comprises a plurality of inputs, each of which is specific to a particular level of the documents.

17. The system of claim 16, wherein the plurality of inputs comprises:

a first input corresponding to a maximum number of displayable different lines per paragraph; and a second input corresponding to a maximum number of displayable different characters per line.

18. The system of claim 13, wherein the input is adjustable by a user.

\* \* \* \* \*